United States Patent
Noda et al.

(10) Patent No.: US 10,572,303 B2
(45) Date of Patent: Feb. 25, 2020

(54) COMPUTER-IMPLEMENTED TASK SWITCHING ASSISTING BASED ON WORK STATUS OF TASK

(71) Applicant: FUJITSU LIMITED, Kawasaki-shi, Kanagawa (JP)

(72) Inventors: Masahide Noda, Kawasaki (JP); Kei Taira, Kita (JP); Motoshi Sumioka, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 15/641,698

(22) Filed: Jul. 5, 2017

(65) Prior Publication Data

US 2017/0300355 A1    Oct. 19, 2017

Related U.S. Application Data

(63) Continuation of application No. PCT/JP2015/050247, filed on Jan. 7, 2015.

(51) Int. Cl.
*G06F 9/48*    (2006.01)
*G06F 9/445*    (2018.01)

(52) U.S. Cl.
CPC .............. *G06F 9/485* (2013.01); *G06F 9/445* (2013.01); *G06F 9/4881* (2013.01)

(58) Field of Classification Search
None
See application file for complete search history.

(56) References Cited

U.S. PATENT DOCUMENTS

| 4,809,157 | A | * | 2/1989 | Eilert | .................... | G06F 9/4812 |
| | | | | | | 710/269 |
| 5,168,566 | A | * | 12/1992 | Kuki | .................... | G06F 9/3851 |
| | | | | | | 712/E9.053 |

(Continued)

FOREIGN PATENT DOCUMENTS

JP    5-20038    1/1993
JP    10-63362    3/1998

(Continued)

OTHER PUBLICATIONS

International Search Report for PCT/JP2015/050247, dated Mar. 10, 2015.

(Continued)

*Primary Examiner* — Van H Nguyen
(74) *Attorney, Agent, or Firm* — Staas & Halsey LLP

(57) ABSTRACT

A task switching assisting method includes storing, by an information processing apparatus, task information regarding a task executed by a user. An element related to execution of the task is stored in correlation with the task information, an operation related to the task is determined, a work status with respect to the correlated element related to the execution of the task is determined based on the determined operation related to the task, the task is switched by saving or restoring the work status, based on the task information and the work status with respect to the correlated element related to the execution of the task, task execution resource information for executing the task and task saving resource information at a time of saving the task are analyzed on a task basis, and the task information is generated based on a result of the analysis, by the information processing apparatus.

10 Claims, 18 Drawing Sheets

(56) References Cited

U.S. PATENT DOCUMENTS

| | | | |
|---|---|---|---|
| 6,243,735 B1* | 6/2001 | Imanishi | G06F 9/3009 712/E9.032 |
| 6,553,400 B1 | 4/2003 | Fukuda | |
| 6,865,636 B1* | 3/2005 | Hober | G06F 9/4881 710/260 |
| 7,412,590 B2* | 8/2008 | Tomisawa | G06F 9/462 712/228 |
| 7,685,599 B2* | 3/2010 | Kanai | G06F 9/4881 370/395.4 |
| 8,024,742 B2* | 9/2011 | Lescouet | G06F 9/4555 711/151 |
| 8,327,379 B2* | 12/2012 | Maruyama | G06F 9/4843 712/220 |
| 8,341,641 B2* | 12/2012 | Maruyama | G06F 9/462 718/108 |
| 8,776,079 B2* | 7/2014 | Maruyama | G06F 9/462 718/108 |
| 2010/0262976 A1* | 10/2010 | Maruyama | G06F 9/462 718/108 |
| 2012/0210323 A1 | 8/2012 | Hosouchi et al. | |
| 2014/0108356 A1 | 4/2014 | Yanagisawa | |
| 2014/0282553 A1 | 9/2014 | Clark et al. | |

FOREIGN PATENT DOCUMENTS

| | | |
|---|---|---|
| JP | 2000-250667 | 9/2000 |
| JP | 2001-5546 | 1/2001 |
| JP | 2001-100886 | 4/2001 |
| JP | 2004-287999 | 10/2004 |
| JP | 2006-277064 | 10/2006 |
| JP | 2006-323702 | 11/2006 |
| JP | 2007-213248 | 8/2007 |
| JP | 2011-53995 | 3/2011 |
| JP | 2014-81772 | 5/2014 |

OTHER PUBLICATIONS

Written Opinion of the International Searching Authority for PCT/JP2015/050247, dated Mar. 10, 2015.
Espacenet English Abstract for Japanese Patent Publication No. 10-63362, published on Mar. 6, 1998.
Espacenet English Abstract for Japanese Patent Publication No. 2000-250667, published on Sep. 14, 2000.
Espacenet English Abstract for Japanese Patent Publication No. 2001-005546, published on Jan. 12, 2001.
Patent Abstracts of Japan for Japanese Patent Publication No. 2014-081772, published on May 8, 2014.
Patent Abstracts of Japan for Japanese Patent Publication No. 2007-213248, published on Aug. 23, 2007.
Patent Abstracts of Japan for Japanese Patent Publication No. 2011-053995, published on Mar. 17, 2011.
Patent Abstracts of Japan for Japanese Patent Publication No. 2006-277064, published on Oct. 12, 2006.
Patent Abstracts of Japan for Japanese Patent Publication No. 2006-323702, published on Nov. 30, 2006.
Patent Abstracts of Japan for Japanese Patent Publication No. 05-020038, published on Jan. 29, 1993.
Patent Abstracts of Japan for Japanese Patent Publication No. 2004-287999, published on Oct. 14, 2004.
Patent Abstracts of Japan for Japanese Patent Publication No. 2001-100886, published on Apr. 13, 2001.
Office Action for corresponding European Patent Application No. 15876832.5, dated Aug. 7, 2019.
Extended European Search Report for corresponding European Patent Application No. 15876832.5, dated Jan. 5, 2018.

* cited by examiner

FIG.8A

```
TASK ID:00000001
TASK NAME:APPLICATION FORM CREATION
TASK EXECUTION RESOURCE:
·APPLICATION FORM.doc
TASK SAVING RESOURCES:
·Word ENVIRONMENTAL RESOURCES (RESOURCES OF
EDITING APP FOR APPLICATION FORM.doc)
  ·STORAGE LOCATION OF APPLICATION FORM.doc
  ·POSITION AND SIZE OF OPENED Window
  ·OPENED PAGE
  ·CURSOR LOCATION
  ·LOCATION IF SELECTED
```

FIG.8B

```
TASK ID:00000002
TASK NAME:APPARATUS PURCHASE PROCEDURE
TASK EXECUTION RESOURCE:
· http://koubai.sample.jp/koubai
TASK SAVING RESOURCES:
·BROWSER ENVIRONMENTAL RESOURCES (RESOURCES OF
APP THAT VIEWS URL OF TASK EXECUTION RESOURCE)
  ·POSITION AND SIZE OF Window THAT HAS OPENED URL
  ·WHICH PART OF URL HAS BEEN DISPLAYED
  ·WHAT HAS BEEN ENTERED IN ENTRY FORM
  ·CURSOR LOCATION ON ENTRY FORM
  ·LOCATION IF SELECTED
·BROWSER ENVIRONMENTAL RESOURCES OF
http://koubai.sample.jp/list
```

FIG.9A

```
TASK ID:00000005
TASK NAME:PAPER WRITING
REQUIRED TIME:10 HOURS
TASK EXECUTION RESOURCE:
・PAPER A.doc
TASK SAVING RESOURCES:
・Word ENVIRONMENTAL RESOURCES (RESOURCES
OF EDITING APP FOR PAPER A.doc)
   ・STORAGE LOCATION OF PAPER A.doc
   ・POSITION AND SIZE OF OPENED Window
   ・OPENED PAGE
   ・CURSOR LOCATION
   ・LOCATION IF SELECTED
```

FIG.9B

```
TASK ID:00000015
TASK NAME:PAPER WRITING 1
REQUIRED TIME:2 HOURS
TASK EXECUTION RESOURCE:
・PAPER A.doc
TASK SAVING RESOURCES:
・Word ENVIRONMENTAL RESOURCES (RESOURCES
OF EDITING APP FOR PAPER A.doc)
   ・ ・・・
PRE-DIVISION TASK ID:00000005
SUBSEQUENT TASK ID:00000016
```

FIG.9C

```
TASK ID:00000016
TASK NAME:PAPER WRITING 2
REQUIRED TIME:2 HOURS
TASK EXECUTION RESOURCE:
·PAPER A.doc
TASK SAVING RESOURCES:
·Word ENVIRONMENTAL RESOURCES (RESOURCES
OF EDITING APP FOR PAPER A.doc)
  · ...
PRE-DIVISION TASK ID:00000005
SUBSEQUENT TASK ID:00000017
```

FIG.10A

| TASK ID | SAVING RESOURCE |
|---|---|
| TASK A | APPLICATION FORM FOR USE.doc<br>http://any.equip.example.jp/ |
| TASK B | FACILITIES INFORMATION.doc<br>http://any.equip.example.jp/ |

FIG.10B

| RESOURCE INFORMATION | PARAMETER |
|---|---|
| http://any.equip.example.jp/ | geometry:800x600+20+20 |
| APPLICATION FORM FOR USE.doc | geometry:400x300+10+20 |
| FACILITIES INFORMATION.doc | geometry:480x300+50+20 |

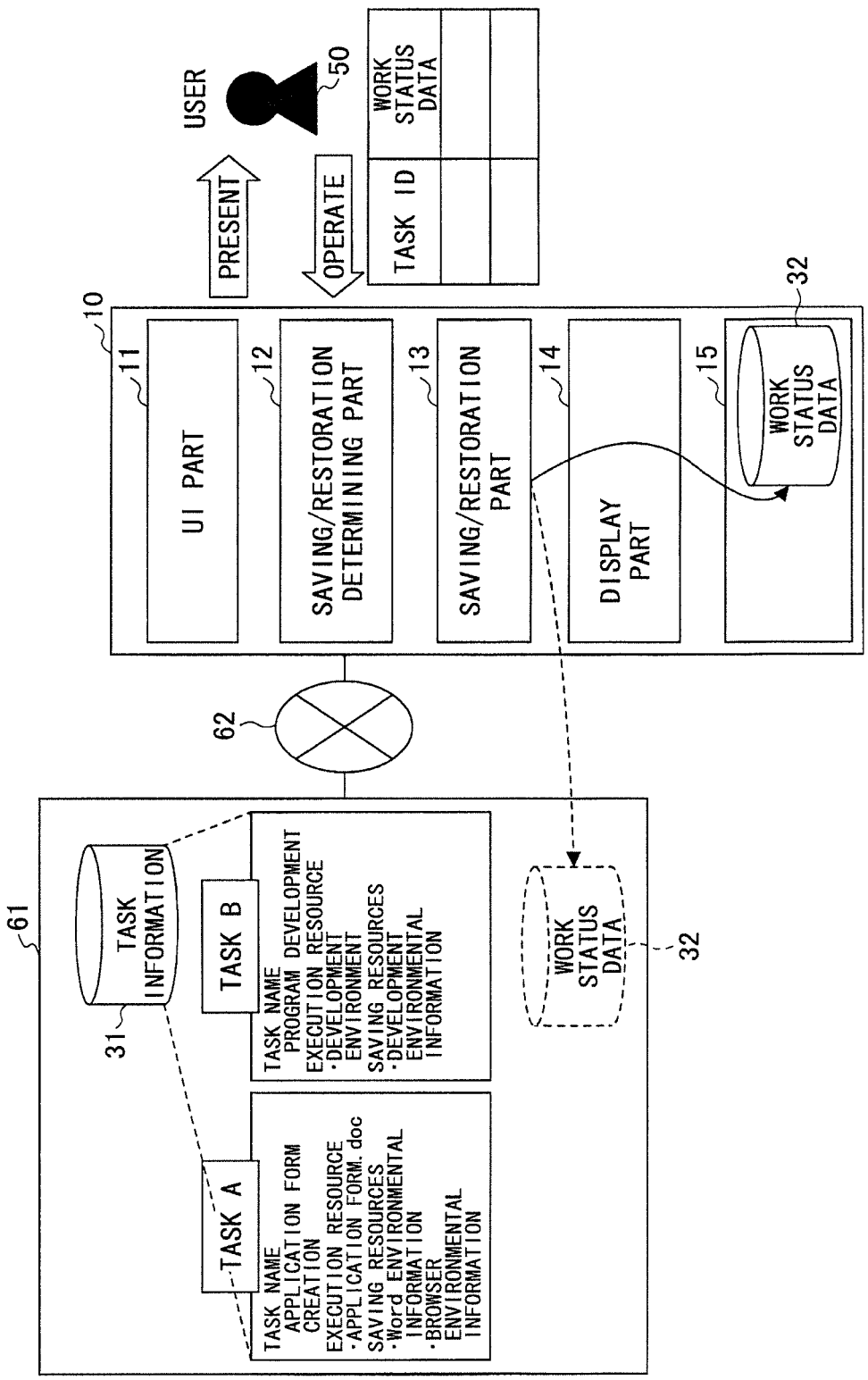

COMPUTER-IMPLEMENTED TASK SWITCHING ASSISTING BASED ON WORK STATUS OF TASK

CROSS-REFERENCE TO RELATED APPLICATION

This application is a continuation application of International Application PCT/JP2015/050247, filed on Jan. 7, 2015, and designating the U.S., the entire contents of which are incorporated herein by reference.

FIELD

A certain aspect of the embodiments discussed herein is related to task switching assisting methods and information processing apparatuses.

BACKGROUND

Man is not good at switching tasks. In particular, man is considered as not being good at remembering what has been done while doing another thing, and restoring what has been done. Man, however, has various tasks to execute, and has to handle the tasks while switching them. Accordingly, there is a demand for a function that assists in executing various tasks while switching them.

PRIOR ART DOCUMENTS

Patent Documents

[Patent Document 1] Japanese Laid-open Patent Publication No. 10-63362
[Patent Document 2] Japanese Laid-open Patent Publication No. 2000-250667
[Patent Document 3] Japanese Laid-open Patent Publication No. 2001-5546

SUMMARY

According to an aspect of the invention, A task switching assisting method includes storing, by an information processing apparatus, task information regarding a task executed by a user. An element related to execution of the task is stored in correlation with the task information, an operation related to the task is determined, a work status with respect to the correlated element related to the execution of the task is determined based on the determined operation related to the task, the task is switched by saving or restoring the work status, based on the task information and the work status with respect to the correlated element related to the execution of the task, task execution resource information for executing the task and task saving resource information at a time of saving the task are analyzed on a task basis, and the task information is generated based on a result of the analysis, by the information processing apparatus.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIG. 8A is a (first) diagram illustrating example task information.

FIG. 8B is a (second) diagram illustrating example task information.

FIG. 9A is a diagram illustrating task information before division.

FIG. 9B is a (first) diagram illustrating task information divided into two.

FIG. 9C is a (second) diagram illustrating the task information divided into two.

FIG. 10A is a (first) diagram illustrating work status data at the time of task division.

FIG. 10B is a (second) diagram illustrating the work status data at the time of task division.

FIG. 11 is a diagram illustrating a system arrangement of a task switching system.

DESCRIPTION OF EMBODIMENTS

In the case of a task for which an information processing apparatus such as a computer is used to use multiple applications (hereinafter abbreviated as "apps") or contents (such as files), a user has to remember apps or contents necessary for the task. Furthermore, according to conventional techniques, a user has to determine a task switching process of saving or restoring a task, and accordingly, cumbersome operations are required.

According to an aspect, it is possible to switch tasks with efficiency.

An embodiment is described below based on the drawings.

<Functional Arrangement of Information Processing Apparatus According to this Embodiment>

Figure 1:
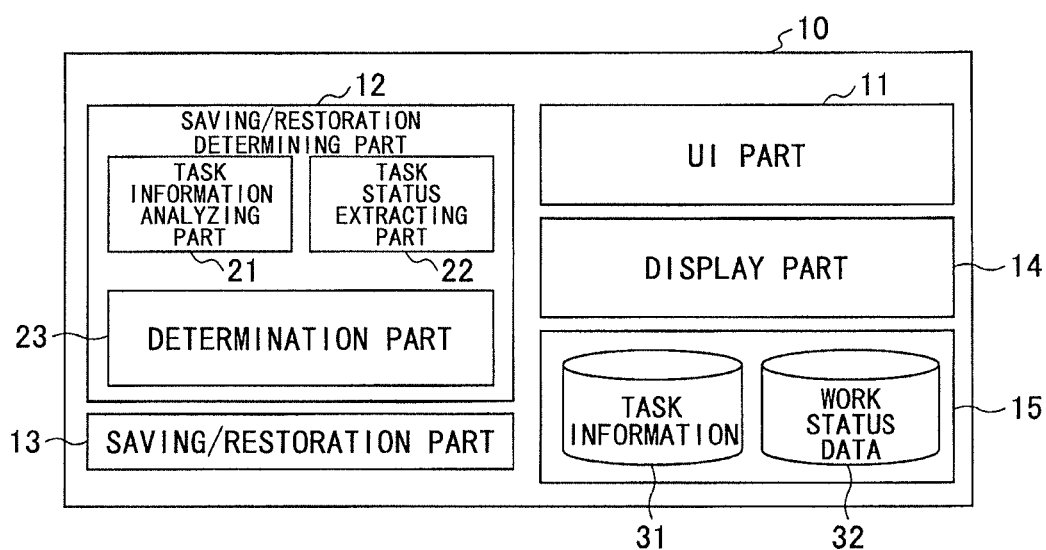
FIG. 1 is a diagram illustrating a functional arrangement of an information processing apparatus according to this embodiment.

FIG. 1 is a diagram illustrating a functional arrangement of an information processing apparatus according to this embodiment. An information processing apparatus 10 illustrated in FIG. 1 includes a user interface part (hereinafter referred to as "UI part") 11, a saving/restoration determining part 12, a saving/restoration part 13, a display part 14, and a storage part 15. The saving/restoration determining part 12 includes a task information analyzing part 21, a task status extracting part 22, and a determination part 23. The storage part 15 includes task information 31 and work status data 32.

The information processing apparatus 10 manages a task to be executed by a user, and on an as-needed basis, performs task switching operations such as saving a task or a content used for a task, presenting a saved task, etc., to a user, and restoring a saved state. The information processing apparatus 10 is, for example, a personal computer (PC), a notebook PC, a tablet terminal, or a smartphone, but is not limited to these.

The UI part 11 displays a screen for executing one or more tasks, a screen for providing various kinds of settings, etc., on the display part 14, and obtains instructions to set various kinds of information and instructions to execute various kinds of task-related processes from a user.

The saving/restoration determining part 12 determines a work status with respect to elements related to execution of a task based on an operation related to a task. The elements related to execution of a task are, for example, information retained inside the information processing apparatus 10, such as apps or contents related to a task, and such information external to the information processing apparatus 10 as is obtained from a sensor connected to the information processing apparatus 10 or obtained from another apparatus through communications by the information processing apparatus 10. The elements related to execution of a task may also be information that prevents execution of a task in addition to the below-described "task execution resource," "task saving resources," and environmental information at the time of execution of a task.

For example, the saving/restoration determining part 12 determines the necessity of saving or restoring a work status (a work environment) based on a user's operation on a task. The work status is, for example, the use information and update information of the above-described elements related to execution of a task (for example, apps or contents related to a task), but is not limited to these.

The task information analyzing part 21 monitors resources in task execution or task saving, and analyzes the type of each task and contents used in a task. Furthermore, the task information analyzing part 21 generates task information and analyzes task information to be presented to a user.

For example, the task information analyzing part 21, with respect to each task, analyzes task execution resource information for executing a task and task saving resource information at the time of saving a task, and generates task information based on the results of the analysis. Furthermore, the task information analyzing part 21 may obtain a task execution resource and task saving resources based on definition information predefined with respect to each task. For example, the task information analyzing part 21 makes it possible to define a task execution resource and task saving resources as parameters with respect to each task.

The task execution resource is, for example, the name of a file with respect to which a task is being executed or the name of a content that is referred to (for example, the name of an image file or the name of a video file), but is not limited to these. The task saving resources are, for example, the environmental resources of an app such as Word (registered trademark), such as the storage location of a task execution resource, the position and size of a window that has been open, a page, the location of a cursor, and a position if it is selected, but are not limited to these.

An app may be word processing software such as Word, spreadsheet software such as Excel (registered trademark), or a basic app that performs general operations such as scrolling or changing screens in response to a swipe or tap and launching a Web browser. Furthermore, various types of apps are executed on an Operating System (OS), which is, but is not limited to, for example, Android (registered trademark), Windows (registered trademark), or Linux (registered trademark).

The task information analyzing part 21, for example, analyzes a time required for a single task, and if the task is one of tasks into which a time-consuming task is divided, analyzes from task information whether the task is individually completed but is not finished as work. For example, the task information analyzing part 21 refers to the subsequent task to analyze whether the presented task and the subsequent task are divisions. As a non-limiting example, with respect to a divisional task, the task information analyzing part 21 may include a parameter that indicates task identification information (for example, a task ID) before division in the information of the task and determine whether the task is a divisional task or not by comparing the pre-division task IDs of the presented task and the subsequent task.

The task status extracting part 22 extracts the execution status of a task at predetermined time intervals or in response to a user's predetermined operation. For example, the task status extracting part 22 determines an operation related to a task, and stores the work status data of an app or content related to the task in correlation with task information (for example, a task ID).

Furthermore, the task status extracting part 22 extracts, from a user's operation on a task execution resource, the work status of the user with respect to the task, and abstracts the work status into at least one of preset kinds of classifications in accordance with the work status. Examples of work status classifications include, but are not limited to, "Started," "Continuing," "Completed," and "Interrupted."

For example, the task status extracting part 22 classifies the work status as "Started" in the case of detecting an input to an application form file for the first time, and as "Completed" in the case where all the fields of the application form file are filled in and the file is closed. When it is possible to extract the progress rate of a task, the task status extracting part 22 classifies 0% as "Started" and 100% as "Completed." Furthermore, the task status extracting part 22 may classify intermediate progress rates as "Continuing." Furthermore, for example, when detecting such an operation as to start a different task before detecting the closure of the target file of a task, the task status extracting part 22 classifies the work as "Interrupted." Furthermore, the task status extracting part 22 classifies the work status to "Interrupted" also in the case of extracting the operation of explicitly interrupting a task (such as the iconification of a file).

The determination part 23 determines whether or not it is necessary to perform saving or restoration, based on task information obtained from the task information analyzing part 21 and a task execution status obtained from the task status extracting part 22.

The saving/restoration part 13 saves or restores a task in the information processing apparatus 10 based on an instruction from the saving/restoration determining part 12. For example, the saving/restoration part 13, based on task information and a work status with respect to an element related to task execution, switches tasks by saving or restoring the work status.

In the case of saving a task, the saving/restoration part 13 stores task information including a work status in the storage part 15. Furthermore, in the case of restoring the saved task, the saving/restoration part 13 executes a restoring process using the task information stored in the storage part 15.

The display part 14 displays various kinds of setting screens and a screen for executing a task in the UI part 11, and displays a message or a pop-up screen at the time of saving or restoration.

The storage part 15 determines the task information 31 and a task-related operation, and stores the work status data 32 in which an element related to task execution is correlated with the task information 31.

In the storage part 15, the task information 31 includes information regarding a task that is being executed by or a saved task to be executed by a user. The task information 31 is managed in advance as task definition information. At the time of saving, the task information 31 related to a task that is being executed is stored in the storage part 15, and at the time of restoration, the task is restored to the saved state, using the task information 31 stored in the storage part 15.

The task definition information includes, for example, with respect a task executed by a user, what is generated in the task and what is necessary for the generation. What is generated is, but is not limited to, for example, document information when the task is document creation and the contents of application when the task is application on the Web. What is necessary for the generation is, but is not limited to, for example, a content referred to in the task, which is a similar document created in the past when the task is document creation and address information (such as a Uniform Resource Locator (URL)) at which reference information is recited when the task is application. Furthermore, when to save and when to restore are determined by extracting a user's operation based on information defined in the task information 31.

The work status data 32 include the work status of each task determined by the saving/restoration determining part 12. Each task is identified by identification information (a task ID) or the like. Furthermore, the work status data 32 contain, but are not limited to, resource information and work classifications.

Data stored in the storage part 15 are not limited to the task information 31 and the work status data 32, and various kinds of setting information, execution results, error information, etc.

According to this embodiment, for example, various apps or contents used in executing a task are managed in association with the task information 31, and the task is saved or restored in accordance with the work status data 32 of the task.

<Hardware Arrangement of Information Processing Apparatus 10>

Figure 2:
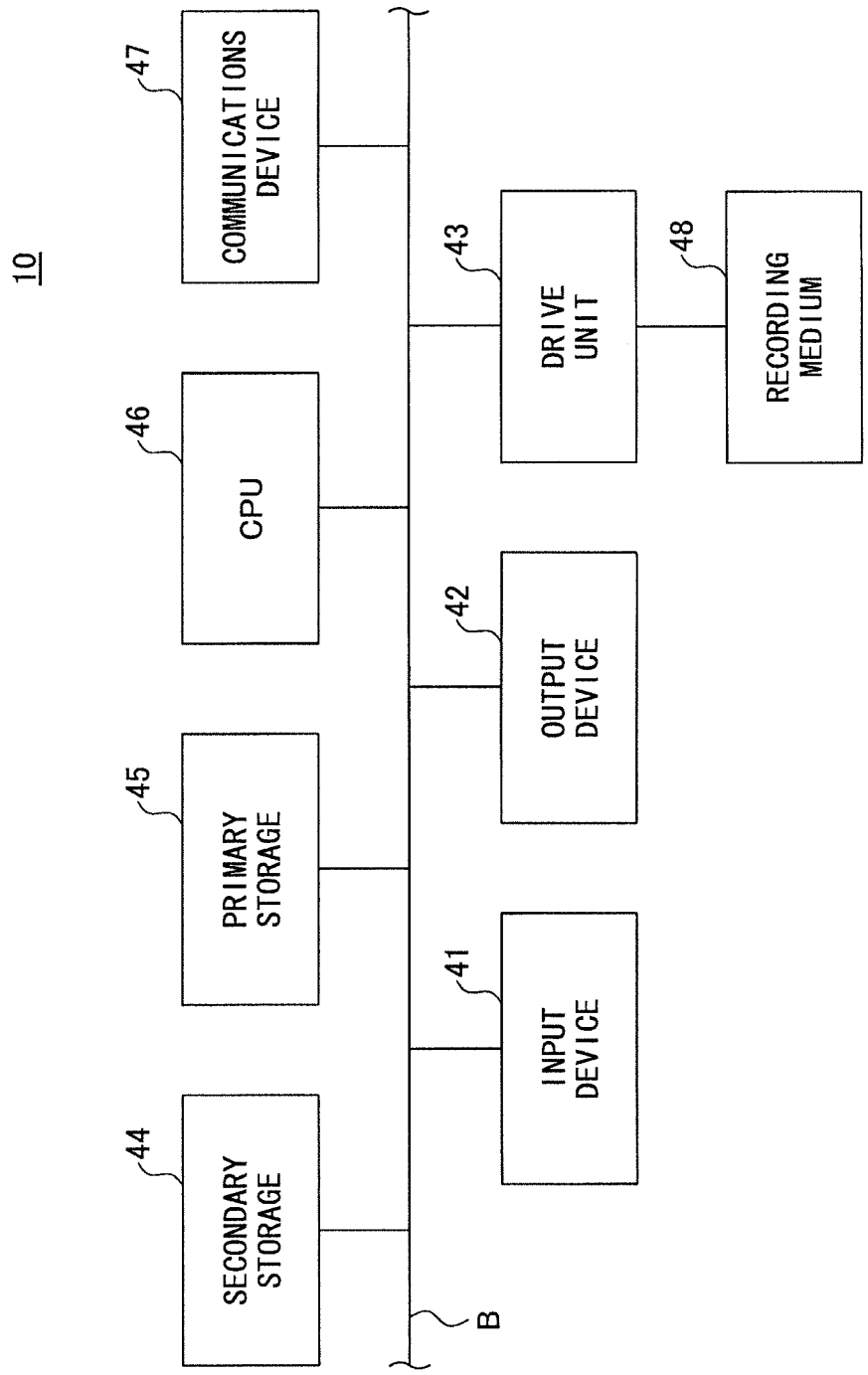
FIG. 2 is a diagram illustrating a hardware arrangement of the information processing apparatus.

Next, a hardware arrangement of the above-described information processing apparatus 10 is described using a drawing. FIG. 2 is a diagram illustrating a hardware arrangement of an information processing apparatus. In the illustration of FIG. 2, the information processing apparatus 10 includes an input device 41, an output device 42, a drive unit 43, a secondary storage 44, a primary storage 45, a Central Processing Unit (CPU) 46, and a communications device 47, which are interconnected by a system bus B.

The input device 41 includes a keyboard and a pointing device such as a mouse, operated by a user, and an audio input device such as a microphone, and receives an instruction to execute a program, various kinds of operation information, and information for starting software such as an app, input from a user.

The output device 42 includes a display that displays various kinds of windows, data, etc., necessary to operate a computer body (the information processing apparatus 10) to execute processes according to this embodiment. A control program of the CPU 46 enables the output device 42 to display the progress, results, etc., of execution of a program.

Here, according to this embodiment, for example, an execution program installed in the computer body is provided by way of a recording medium 48 or the like. The recording medium 48 may be set in the drive unit 43. The execution program stored in the recording medium 48 is installed in the secondary storage 44 from the recording medium 48 via the drive unit 43 based on a control signal from the CPU 46.

The secondary storage 44 is storage means such as a Hard Disk Drive (HDD) or a Solid State Drive (SDD). The secondary storage 44, based on a control signal from the CPU 46, stores an execution program according to this embodiment (such as a task switching assisting program), a control program provided in the computer, etc., and performs inputting and outputting on an as-needed basis. The secondary storage 44 can read necessary information from stored information and perform writing based on a control signal from the CPU 46.

The primary storage 45 stores an execution program read from the secondary storage 44 by the CPU 46. The primary storage 45 is a Read Only Memory (ROM), a Random Access Memory (RAM), etc.

The CPU 46 implements processes by controlling the processes of the whole computer, such as various kinds of operations and inputting data to and outputting data from hardware components, based on a control program such as an Operating System (OS) and an execution program stored in the primary storage 45. Various kinds of information necessary during execution of a program may be obtained from the secondary storage 44, and the results of execution may be stored in the secondary storage 44.

Specifically, for example, by causing a program installed in the secondary storage 44 to be executed based on an instruction to execute the program obtained from the input device 41, the CPU 46 executes a process corresponding to the program in the primary storage 45. For example, by causing an execution program to be executed, the CPU 46 executes processes such as the above-described reception of information from a user by the UI part 11, determination as to whether to save or restore a task by the saving/restoration determining part 12, saving or restoration of a task by the saving/restoration part 13, and display by the display part 14. The details of processing in the CPU 46 are not limited to those described above. What is executed by the CPU 46 is stored in the secondary storage 44 or the like on an as-needed basis.

The communications device 47 communicates with other external devices via a communications network typified by, for example, the Internet or a Local Area Network (LAN). The communications device 47, based on a control signal from the CPU 46, connects to a communications network to obtain an execution program, software, settings information, etc., from external devices. Furthermore, the communications device 47 may provide external devices with execution results obtained by executing a program and provide external devices with an execution program according to this embodiment.

The recording medium 48 is a computer-readable recording medium storing an execution program, etc., as described above. The recording medium 48 is, but is not limited to, for example, a portable recording medium such as a semiconductor memory such as a flash memory, a CD-ROM, or a DVD.

By installing an execution program (such as a task switching assisting program) in the hardware arrangement illustrated in FIG. 2, it is possible for hardware resources and software to cooperate to execute a task switching assisting process according to this embodiment, etc.

<Diagram for Illustrating Outline of Task Switching Assisting Process According to this Embodiment>

Figure 3:
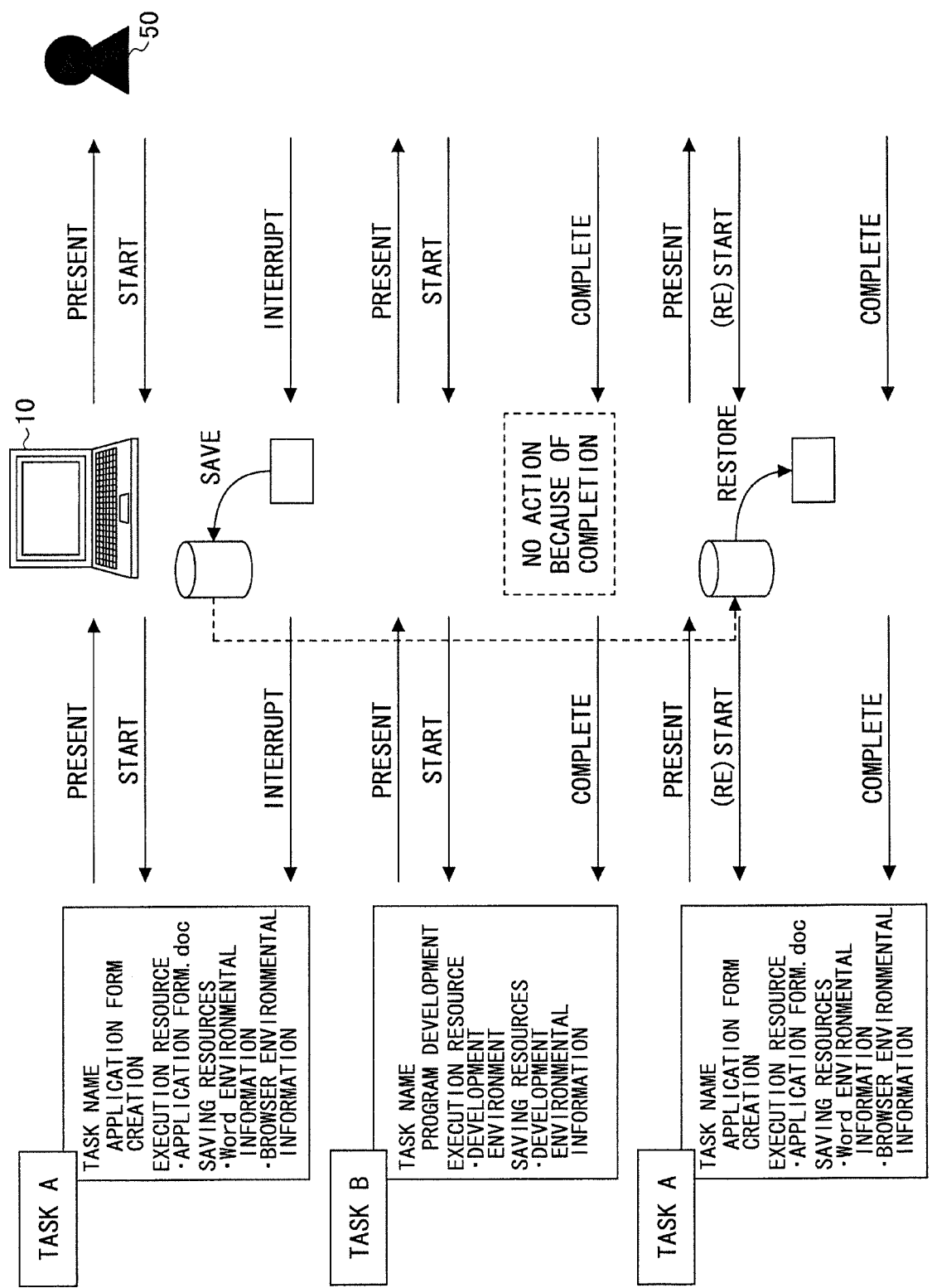
FIG. 3 is a diagram for illustrating the outline of a task switching assisting process according to this embodiment.

Next, the outline of a task switching assisting process according to this embodiment is described using a diagram. FIG. 3 is a diagram for illustrating the outline of a task switching assisting process according to this embodiment.

FIG. 3 illustrates the case of interrupting Task A to execute the task of Task B while a user 50 is executing Task A using the information processing apparatus 10. At this point, information to be saved is generated task by task based on definition information. By generating task information based on definition information, it is possible to limit items to save.

In the illustration of FIG. 3, the task information of Task A and Task B includes, but is not limited to, a task name, an execution resource, and saving resources.

The information processing apparatus 10 monitors the execution status of Task B, and determines the necessity of saving Task B and the timing of restoration of saved Task A (task switching timing).

When Task B is completed, the information processing apparatus 10 can efficiently restore the work environment of Task A based on the task information of Task A and present the restored work details to continuously resume the task without a load on a user. The task information of Task B, which is completed without interruption, is deleted. When the task of restored Task A is completed, the task information of Task A is deleted.

<Example of Task Switching Assisting Process>

Figure 4:
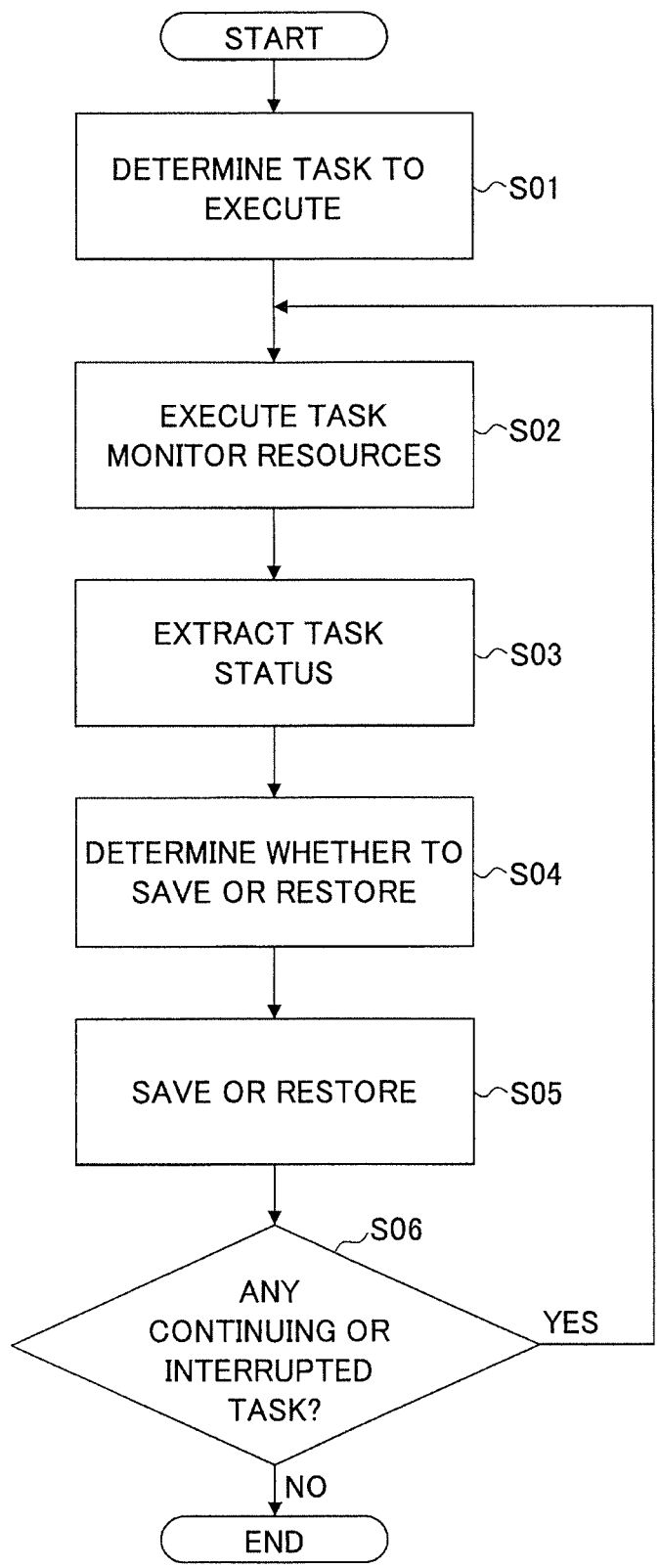
FIG. 4 is a flowchart illustrating a task switching assisting process.

Next, an example of the task switching assisting process according to this embodiment is described using a flowchart. FIG. 4 is a flowchart illustrating a task switching assisting process.

In the illustration of FIG. 4, the information processing apparatus 10 determines a task to execute based on a user's instruction from among one or more tasks whose screens are presented by the UI part 11 (S01). Next, the saving/restoration determining part 12 monitors resources in the execution of the task determined by the process of S01 (S02), and generates task information. Next, the saving/restoration determining part 12 extracts a task status at predetermined time intervals or in response to the user's predetermined operation (S03).

Next, the saving/restoration determining part 12, based on the task information and the user's operation on the task (work status), determines the necessity of saving or restoring the work status to determine whether to save or restore the task (S04), and saves or restores the work status corresponding to the task (S05).

Next, the information processing apparatus 10 determines whether there is a continuing or interrupted task (S06), and if there is a continuing or interrupted task (YES at S06), returns to the process of S02. If there is no continuing or interrupted task (NO at S06), the information processing apparatus 10 determines that all tasks are completed and ends the process.

<Example of Task Status Extracting Process: S03>

Figure 5:
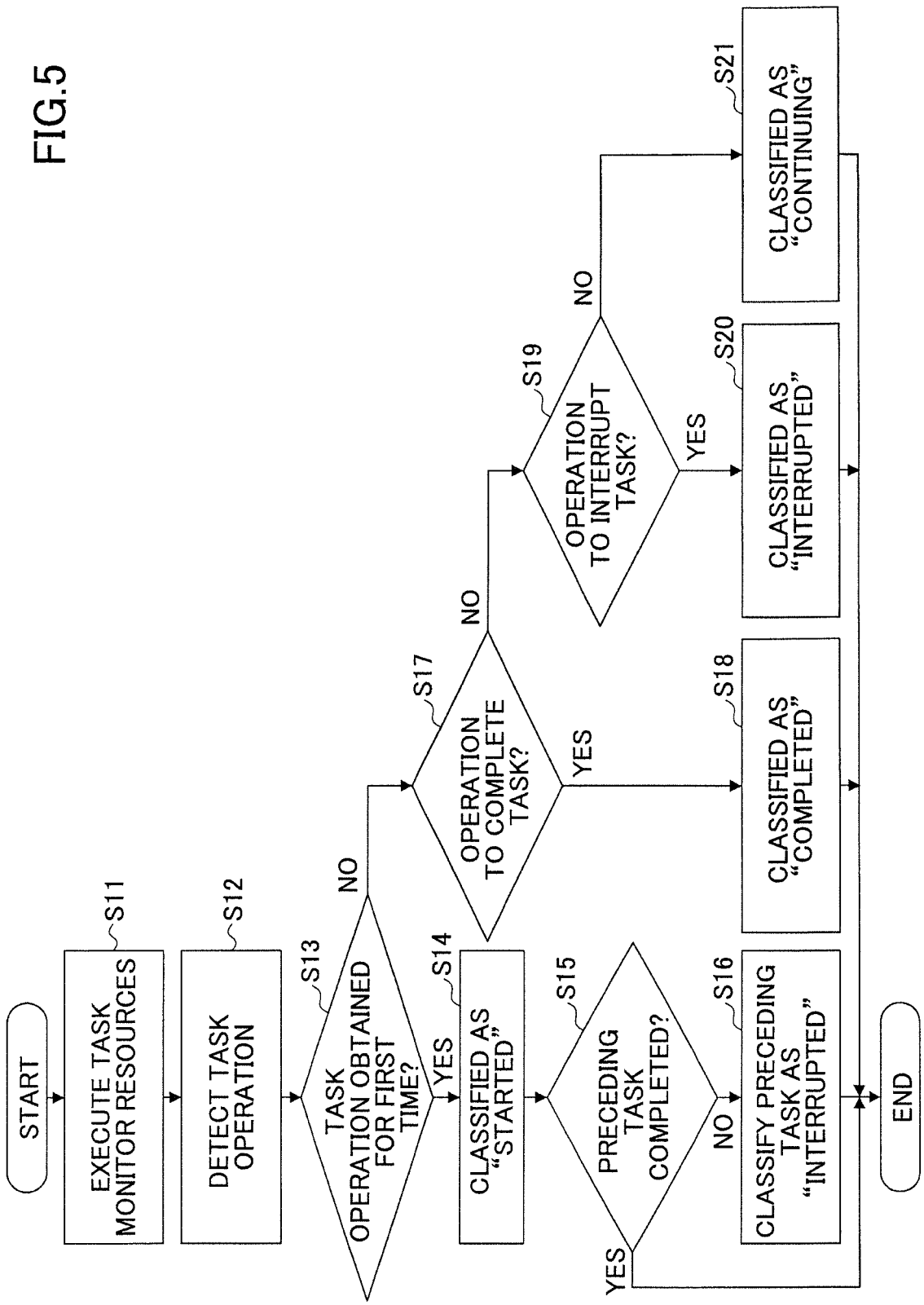
FIG. 5 is a flowchart illustrating a task status extracting process.

Here, an example of the above-described task status extracting process of S03 is described using a flowchart. FIG. 5 is a flowchart illustrating a task status extracting process. In the illustration of FIG. 5, the task status extracting part 22 monitors resources at the time of executing a task (S11), and detects an operation on the task (S12).

Next, the task status extracting part 22 determines whether the operation on the target task from a user is received for the first time (S13), and if the operation on the target task is received for the first time (YES at S13), classifies a work status (task status) as "Started."

Next, the task status extracting part 22 determines whether the preceding task is completed or not (S15), and if not completed (NO at step S15), classifies the preceding task as "Interrupted" (S16). If the preceding task is completed (YES at S15), the task status extracting part 22 ends the process as is.

If the operation on the target task is not received for the first time in the process of S13 (NO at S13), it is determined whether the operation on the target task is an operation to complete the task (S17). If it is an operation to complete the task (YES at S17), it is classified as "Completed" (S18). If it is not an operation to complete the task (NO at S17), it is determined whether it is an operation to interrupt the task (S19). If it is an operation to interrupt the task (YES at S19), the work status (task status) is classified as "Interrupted" (S20). If it is not an operation to interrupt the task in the process of S19 (NO at S19), the work status (task status) is classified as "Continuing" (S21).

<Example of Determination Process: S04>

Figure 6:
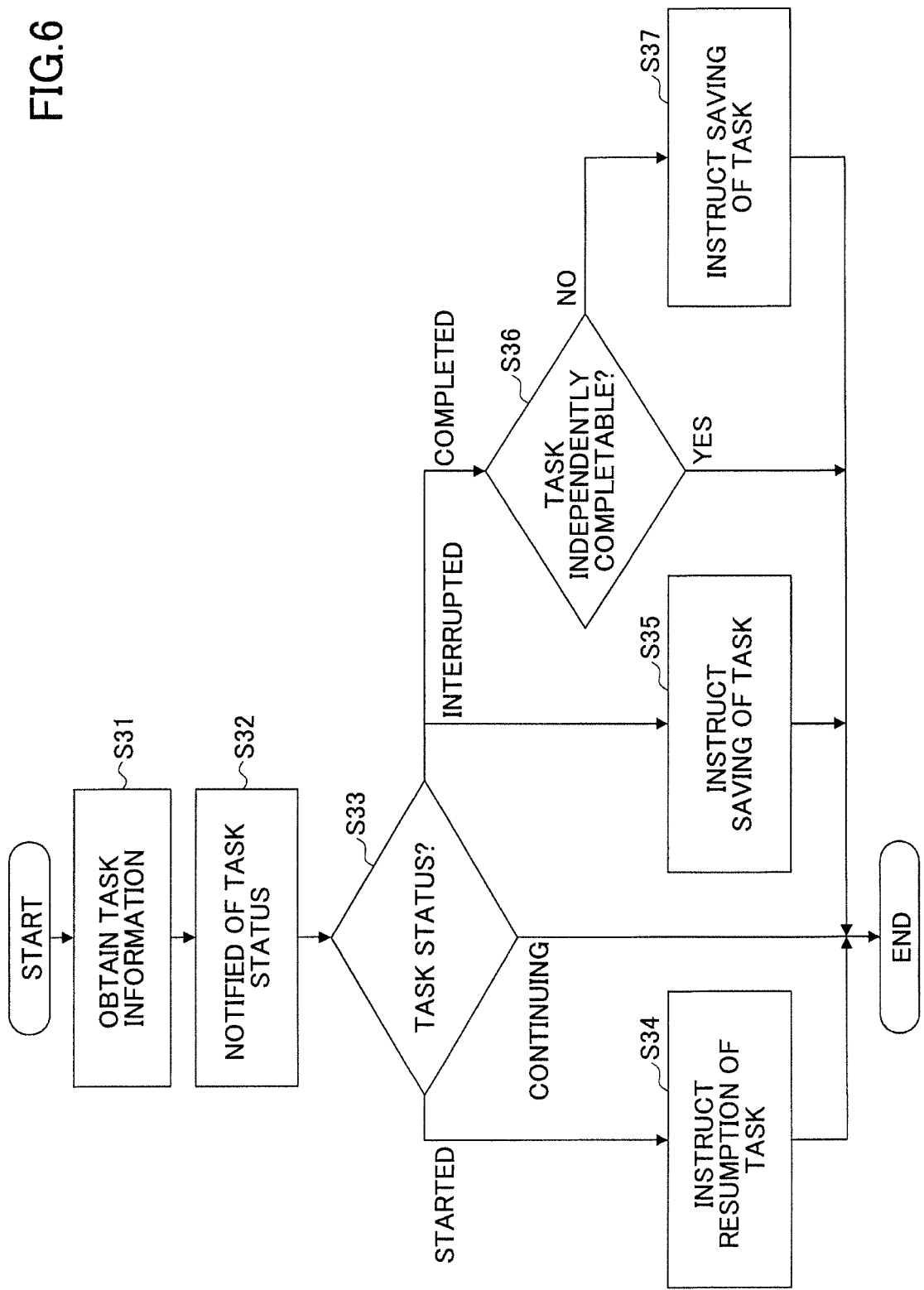
FIG. 6 is a flowchart illustrating a determination process.

Next, an example of the above-described determination process of S04 is described using a flowchart. FIG. 6 is a flowchart illustrating a determination process. In the illustration of FIG. 6, the determination part 23 obtains task information obtained by the task information analyzing part 21 (S31), and receives the notification of a task status (work status) obtained by the task status extracting part 22 (S32).

Next, the determination part 23 executes the following process in accordance with a task status (S33). In the following description, a non-limiting example of the case of being classified as one of "Started," "Continuing," "Interrupted," and "Completed" as described above is illustrated as task status (work status) classification.

If the task status is "Started" in the process of S33, the determination part 23 determines to instruct resumption of the task (S34). If the task status is "Continuing" in the process of S33, the determination part 23 executes no process. If the task status is "Interrupted" in the process of S33, the determination part 23 determines to instruct saving of the task (S35).

If the task status is "Completed" in the process of S33, the determination part 23 determines whether the task is an independently completable task or not (S36). If the task is an independently completable task (YES at S36), the determination part 23 executes no process. If the task is not independently completable in the process of S36 (NO at S36), the determination part 23 determines to instruct saving of the task (S37). As described above, the determination part 23 determines whether a task is interrupted based on information obtained from the task information analyzing part 21 and the task status extracting part 22, and if the task is interrupted, determines to instruct saving of a work environment.

<Example of Saving/Restoration Process: S05>

Figure 7:
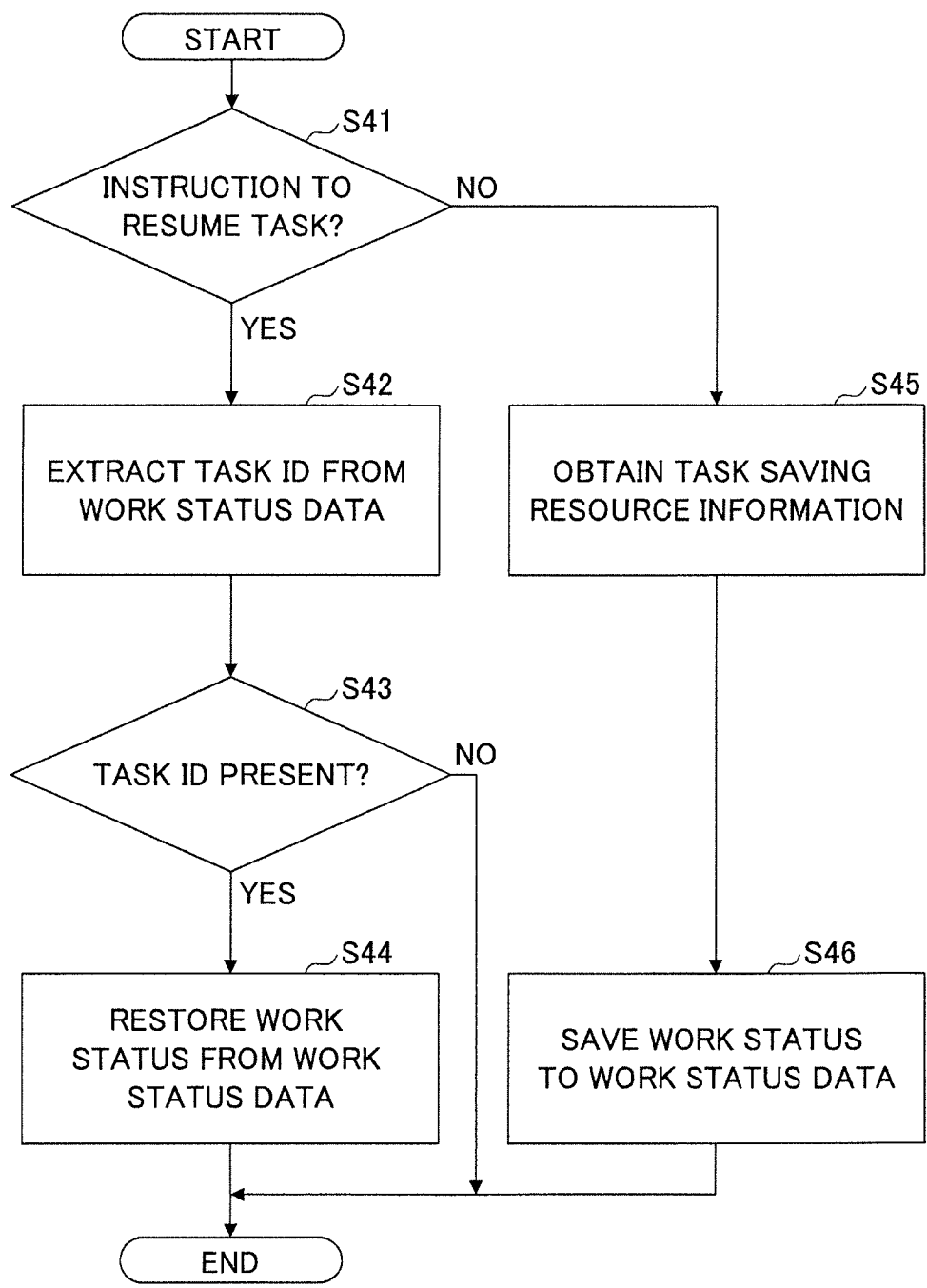
FIG. 7 is a flowchart illustrating a saving/restoration process.

Next, an example of the above-described saving/restoration process of S05 is described using a flowchart. FIG. 7 is a flowchart illustrating a saving/restoration process. In the illustrating of FIG. 7, the saving/restoration part 13 determines whether there is an instruction to resume a task (S41), and if there is an instruction to resume a task (YES at S41), extracts a task ID from the work status data 32 (S42).

Next, the saving/restoration part 13 determines whether there is a task ID (S43), and if there is a task ID (YES at S43), extracts the corresponding task information 31 from the work status data 32, and restores a work status in correspondence to the extracted task information 31 (S44). If there is no task ID in the process of S43 (NO at S43), the saving/restoration part 13 executes no process.

If there is no instruction to resume a task in the process of S41 (YES at S41), the saving/restoration part 13 saves the task, and obtains resource information (S45). Furthermore, the saving/restoration part 13 stores the task information 31 and saves a work status in the work status data 32 (S46).

As described above, the saving/restoration part 13 saves or restores the work status of a terminal based on an instruction from the saving/restoration determining part 12. For example, in response to receiving a "task ID" and an instruction of a classification result of "Saved" from the saving/restoration determining part 12, the saving/restoration part 13 saves a task corresponding to the task ID. In the case of an instruction of "Saved," "task saving resource information" also is saved. Furthermore, in response to receiving a "task ID" and an instruction of a classification result of "Resumed" from the saving/restoration determining part 12, the saving/restoration part 13 restores a task corresponding to the task ID.

<Another Example of Saving/Restoration Process>

Here, as another example of the above-described saving/restoration process, for example, the saving/restoration part 13 can not only execute saving or restoration with respect to the internal environment of the information processing apparatus 10 but also save or restore external environmental information. For example, in the case of the internal environmental information of the information processing apparatus 10, such as the resources of an app, restoration may be executed with respect to the app. In the case of external environmental information, it is difficult to change the external conditions of the information processing apparatus 10. Therefore, at the time of restoration, such a restoration technique may be adopted as notifying a user of external environmental information by displaying it on the display part 14 as accompanying information.

Furthermore, as information that is restored, for example, information that enables a user to easily recall a work status during task execution saved by the user may be added. For example, in the case where a task is worked on in a meeting room at the time of saving, information on the names of persons present in the meeting room may be restored. This makes it possible to easily understand the status before saving.

Furthermore, as a saving process, for example, a resource that is not a target of saving is subjected to saving. For example, when a classification result of "Started" is extracted in the above-described task status extracting process, what sources have been used to execute a task is monitored, and what has been monitored as well is stored in the task information 31. As a result, a resource that is not a target of saving as definition information also can be regarded as being supplementally used to be rendered a target of saving.

For example, when referring to another previously written application form during execution of the task of "writing an application form," the saving/restoration part 13 may render the other previously written application form a target of saving.

Furthermore, for example, the saving/restoration part 13 may present resources operated in a work environment to a user and cause the user to determine whether to render a resource a target of saving with respect to each resource.

Furthermore, the saving/restoration part 13 may regard a resource used above a preset threshold as a resource necessary for a work environment and determine the resource as a target of saving. For example, the saving/restoration part 13 can determine whether it is a target of saving by comparing a time for which the task is foreground or the number of times the task becomes foreground on a display screen of the information processing apparatus 10 with a preset threshold. Furthermore, a resource added as a target of saving can be updated as a saving resource in a task definition to be used in subsequent re-saving.

Furthermore, the saving/restoration part 13 may change the manner of saving a task based on the time interval between saving and restoration (the expected interruption time of a task). For example, in the case of a brief (for example, five-minute) interruption, a resource is temporarily made invisible (for example, an app is iconified), and information indicating that the resource is made invisible alone is stored in work status data. As a result, at the time of restoration, it is only necessary to make the temporarily invisible resource visible. Therefore, it is possible to swiftly execute a restoration process. Furthermore, in the case of a long interruption (for example, until the next day), the saving/restoration part 13 may store a resource in a file and store the storage location in the storage part 15.

Furthermore, the saving/restoration part 13 may change a saving process in accordance with a resource used by a task to be executed after saving. For example, if there is a resource that is not at all used in the subsequent task, the resource alone is temporarily made invisible, and it is stored in the storage part 15 that the resource is made invisible. As a result, at the time of restoration, it is only necessary to restore the invisible resource. Therefore, it is possible to swiftly execute a restoration process.

<Task Information Examples>

Here, examples of the task information 31 are described using drawings. FIGS. 8A and 8B are (first and second) diagrams illustrating examples of task information. FIG. 8A illustrates example task information in a status where an application form has been created as a task. FIG. 8B illustrates example task information in the status of executing a procedure through a browser as a task.

In the illustrations of FIG. 8A and FIG. 8B, it is assumed that the resources of an app are those obtainable from the corresponding app and OS. Task definition information corresponding to task information includes, but are not limited to, for example, as illustrated in FIG. 8A and FIG. 8B, a "task ID" for identifying a task, a "task name," a "task execution resource" used mainly in executing a task, and "task saving resources" that are resource information serving a supplementary role in executing a task, and may include, for example, a resource that hinders the execution of a task.

The "task execution resource" is, but is not limited to, for example, a document file in the case of a task that creates a document, and the address information (for example, URL) of an approval system in the case of a task that approves application.

The "task saving resources" include, but are not limited to, for example, the execution resources of a document creating app, the resources of a content such as reference material, what is entered in an entry form, and the position of a cursor in the case of a task that creates a document. Furthermore, the above-described resources of an app include, but are not limited to, for example, the position (screen position) and size of a Window and the number of an opened (displayed) page.

The resources of a content such as reference material include, but are not limited to, for example, address information (for example, a URL) displayed by a Web browser and its Window position, size, and the display elements of a page. In the case of executing a procedure through a Web browser as illustrated in FIG. 8B, browser environmental resources with respect to a URL in the case where reference material is open (for example, when the page of a list of apparatuses that are objects of a purchase procedure is open, its browser environmental resources) may be included in the targets of saving.

Furthermore, as indicated in the illustrations of FIG. 8A and FIG. 8B, the task information according to this embodiment is not limited to the internal information of the information processing apparatus 10, and may include, for example, environmental information (external information) outside the apparatus that the information processing apparatus 10 can obtain, which includes, but is not limited to, for example, the location (position information) of the information processing apparatus 10, meeting attendees, the description of a task, and the date and time information of a task. For example, with respect to the location, it is possible to obtain position information (such as latitude and longitude) using a Global Positioning System (GPS) or the like provided in the information processing apparatus 10. Furthermore, with respect to meeting attendees, for example, it is possible to access an existing conference system through a communications network to obtain attendee information from the accessed system.

Furthermore, information that is not directly related to but hinders execution of a task may be included. This information is composed of information obtainable from the internal information of the information processing apparatus 10 and environmental information (external information) outside the apparatus that the information processing apparatus 10 can obtain. For example, with respect to a task that is interrupted by the reception of e-mail, an incoming call to e-mail software (mailer) running on the information processing apparatus 10 of a user may be obtained. With respect to a task that is interrupted by an incoming phone call, an incoming call to a telephone possessed by a user may be obtained using a sensor or the like.

Here, with respect to the task information according to this embodiment, in the case of a task that runs for a long time (for example, requiring 10 hours), the task may be switched to another task in the middle or divided into several tasks in advance. In such a case, by dividing a task and managing the task information before and after the division, it is possible to perform correlation on the same task through multiple task information items.

FIG. 9A is a diagram illustrating task information before division. FIG. 9B and FIG. 9C are (first and second) diagrams illustrating task information divided into two. The number of divisions is not limited to two, and may be three or more. In the illustration of FIG. 9A, task definition information before division includes, but is not limited to, a "task ID," a "task name," a "required time," a "task execution resource," and "task saving resources." In the illustrations of FIG. 9B and FIG. 9C, task definition information after division includes, but is not limited to, a "task ID," a "task name," a "required time," a "task execution resource," "task saving resources," a "pre-division task ID," and a "subsequent task ID."

In the illustration of FIG. 9A, with respect to a task (parent task) of a task ID "00000005," the required time is set to 10 hours. In this case, when the task is divided, a pre-division task ID and a subsequent task ID (a child task ID) are stored in the task information 31 as illustrated in FIG. 9B and FIG. 9C.

In FIG. 9B and FIG. 9C, the pre-division task ID of the task specified by the subsequent task ID (for example, the subsequent task ID in the case where the order of execution is specified with respect to tasks) is the same. In this case, although "Paper Writing 1" indicated in FIG. 9B is "Completed," "Paper Writing 2" indicated in FIG. 9C is regarded as the subsequent task, so that the entirety is classified as "Interrupted" and determined as a target of resource saving. That is, in the case of divisional tasks, even when a divisional task is individually completed, the work status is determined as "Interrupted" and saved unless all the divisional tasks are completed.

<Storage Example of Divisional Tasks>

Next, a storage example of divisional tasks is described using drawings. FIG. 10A and FIG. 10B are (first and second) diagrams illustrating work status data at the time of task division. FIG. 10A illustrates a saving resource table in the work status data 32, and FIG. 10B is a diagram illustrating resource parameters in the work status data 32.

The items of the saving resource table of the work status data 32 illustrated in FIG. 10A include, but are not limited to, for example, a "task ID" and "saving resources." The items of the parameter table of the work status data 32 illustrated in FIG. 10B include, but are not limited to, for example, "resource information" and a "parameter."

Here, in the case of normal single tasks (tasks that are independently completable), their respective work statuses are independently stored task by task, while in the case of divisional tasks, work information is stored across the tasks.

When the same resource is used for different tasks, the same parameter may be applied to the resource information. For example, when a saving resource is updated from task information and the same resource is used by multiple tasks, a resource saved in a different task is rendered a target of restoration. According to this embodiment, the work status data 32 possessed by the saving/restoration part 13 is split into the saving resource table and the parameter table to make it possible to store a parameter corresponding to resource information.

For example, in the illustration of FIG. 10A, at the time of saving Task A, the parameter of "Application Form for Use.doc" and the parameter of a URL are stored. At the time of restoring Task B, the parameter of "Facilities Information.doc" and the parameter of the same URL as in Task A are referred to, and the task is restored based on their information.

<System Arrangement Using Server>

The information processing apparatus 10 alone executes a task switching process according to the above-described embodiment, which, however, is not limited to this, and a server may manage the task information 31 and the work status data 32.

FIG. 11 is a diagram illustrating a system arrangement of a task switching system. In FIG. 11, a task switching system 60 includes the information processing apparatus 10 and a management server 61. The information processing apparatus 10 and the management server 61 are connected by a communications network 62 typified by, for example, the Internet or a Local Area Network (LAN), to be able to transmit and receive data.

A specific description of the information processing apparatus 10, which has the same arrangement as the above-described arrangement, is omitted herein.

In the illustration of FIG. 11, the management server 61 manages the task information 31 (for example, Task A and Task B) to be executed by a user, and transmits the task information 31 to the information processing apparatus 10 in accordance with a work status in the terminal. In the illustration of FIG. 11, the management server 61 manages the task information 31. Alternatively, however, the information processing apparatus 10 may store a task to be executed by a user.

Furthermore, the information processing apparatus 10 may transmit a task status (the work status data 32) to the management server 61 via the communications network 62 to have the task status managed by the management server 61.

The arrangement as illustrated in FIG. 11 makes it possible to have task information to be executed by a user selected on the management server 61 side. Furthermore, the storage destination of the work status data 32 may be either the storage part 15 of the information processing apparatus 10 or the management server 61.

According to the task switching system 60, the management server 61 may manage the task information 31, the work status data 32, etc., with respect to multiple information processing apparatuses 10. When stored in the management server 61, they include the type information of the information processing apparatuses 10 and user information to be identifiably stored. Furthermore, the management server 61 may use the task information 31 and the work status data 32 obtained from an information processing apparatus 10 for restoration with respect to a different information processing apparatus 10. As a result, for example, when the single user 50 is performing work using multiple information processing apparatuses 10, information worked on in a first information processing apparatus 10 may be saved in the management server 61 and restored based on user information in a second information processing apparatus 10.

The management server 61 may be a PC or the like, or a cloud server composed of cloud computing including one or more information processing apparatuses.

As described above, according to this embodiment, it is possible to specify the timing of saving by defining a task structure, extracting a user's operation on a task, and determining the saving or restoration of a work environment from the task structure and the contents of the operation. Therefore, no unnecessary resources are used for saving. Furthermore, because it is possible to specify what to save task by task, no unnecessary resources are used for saving.

Furthermore, according to this embodiment, because it is possible to specify the contents of work to resume and its timing, it is possible to perform restoration in line with a task to be resumed. Furthermore, according to this embodiment, because there is no need for a user to select what to restore, convenience increases.

First Embodiment

Figure 12:
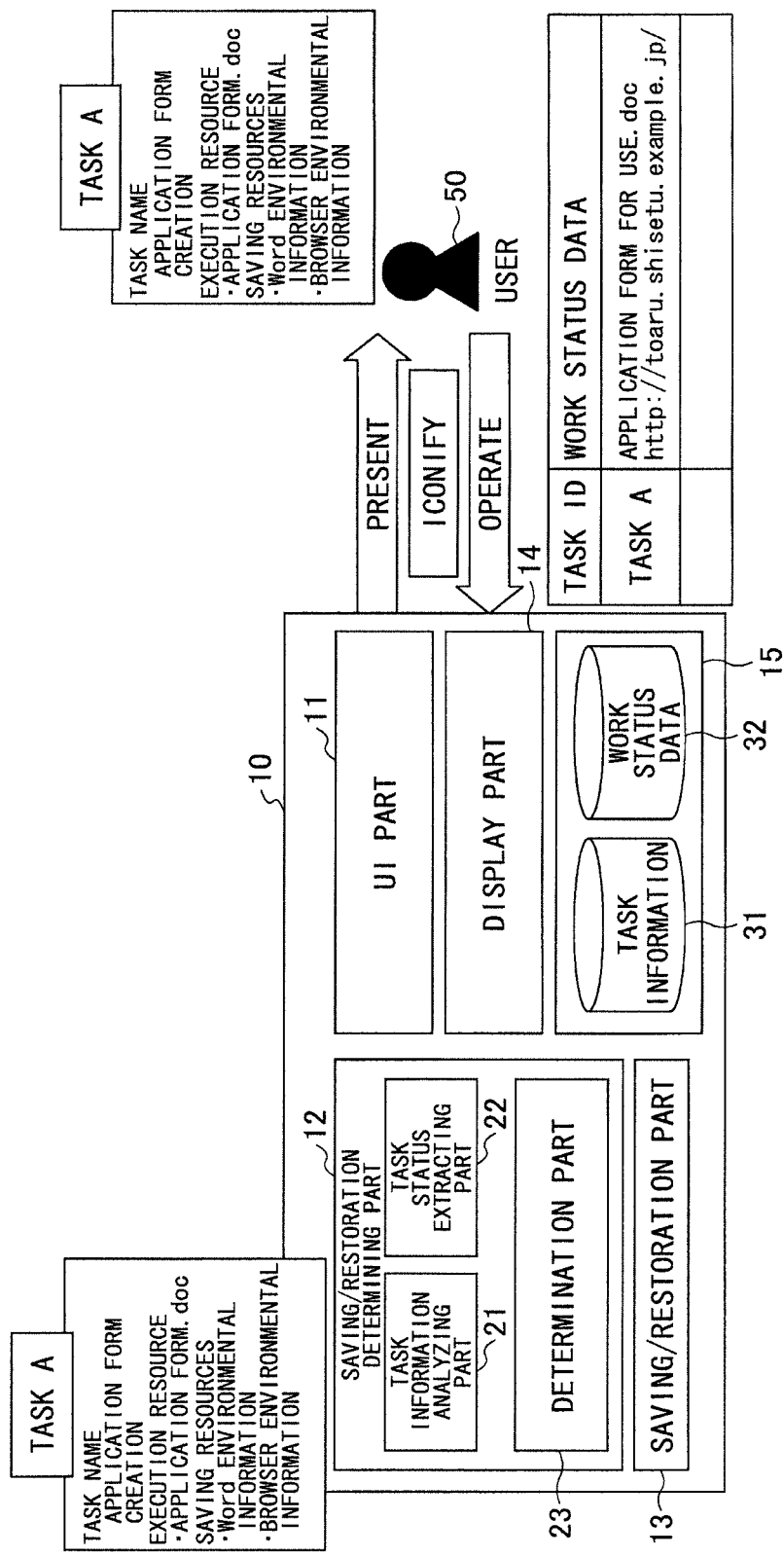
FIG. 12 is a diagram for illustrating a first embodiment of the task switching process.

Next, embodiments of the above-described task switching process are described using drawings. FIG. 12 is a diagram for illustrating a first embodiment of the task switching process. In the illustration of FIG. 12, the same arrangement as the above-described arrangement of the information processing apparatus 10 is illustrated. Therefore, a specific description of each component is omitted herein.

According to the first embodiment, in a system that assists a user's task (work) using the information processing apparatus 10, the start or interruption of the task is detected from an operation on a resource associated with the task. When an interruption is detected, the work environmental information of the task is saved, and when a start is detected, the saved work environmental information of the task is restored.

In the illustration of FIG. 12, in the case of saving the "Application Form Creation Task" of Task A in the middle, the user 50's operation of "iconifying" the task is detected. It is considered as "Interrupted" by the task status extracting part 22. Furthermore, the determination part 23 determines the saving of the task. The saving/restoration part 13 saves an opened Word document and a URL as the task information 31. At this point, a task ID and work status data are saved to the work status data 32.

At the time of saving, the status in which the Word document has been open (such as a window position and a cursor position) may also be obtained from an app and saved.

Figure 13:
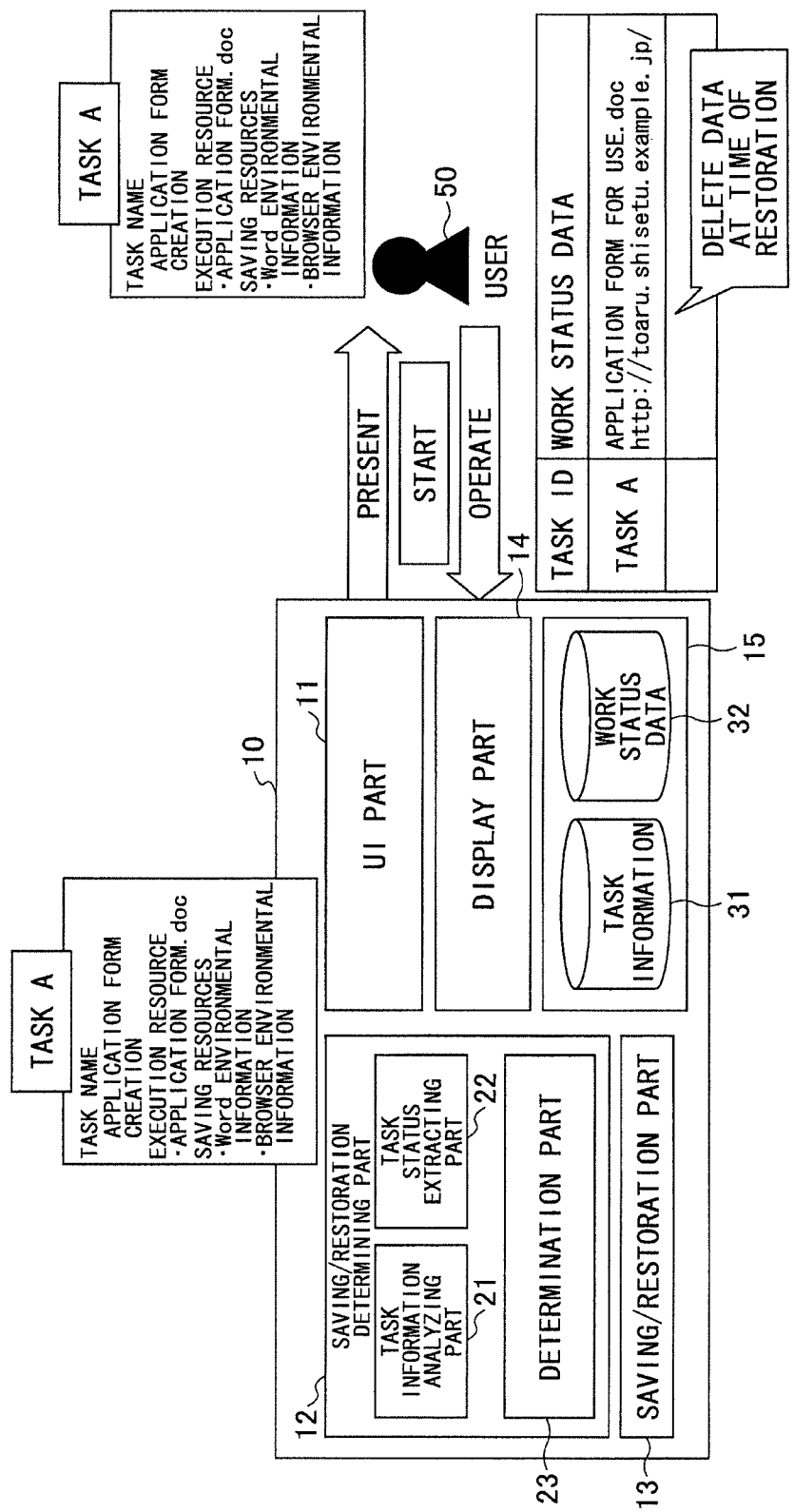
FIG. 13 is a diagram for illustrating a switching process at the time of resuming a task.

FIG. 13 is a diagram for illustrating a switching process at the time of resuming a task. In the illustration of FIG. 13, in the case of resuming the "Application Form Creation Task," for example, a notification as to whether to resume Task A is made at a time that is preset based on the time of saving (for example, a few hours later). The notification may be, but is not limited to, for example, a predetermined pop-up screen displayed on the display part 14. Alternatively, a notification by sound or a notification by a flashing icon may also be made.

When the user 50 performs an operation to start Task A from a pop-up screen displayed on the display part 14 (a start operation is extracted), the determination part 23 determines to restore the task. Furthermore, the saving/restoration part 13 restores, as a work environment, the task information 31 of Task A and the Word document (Application Form for Use.doc) and the URL (http://toaru.shisetu.example.jp/) as work status data correlated with Task A. In the illustration of FIG. 13, at the time of restoration, the restored information is erased from work status data.

Second Embodiment

Figure 14:
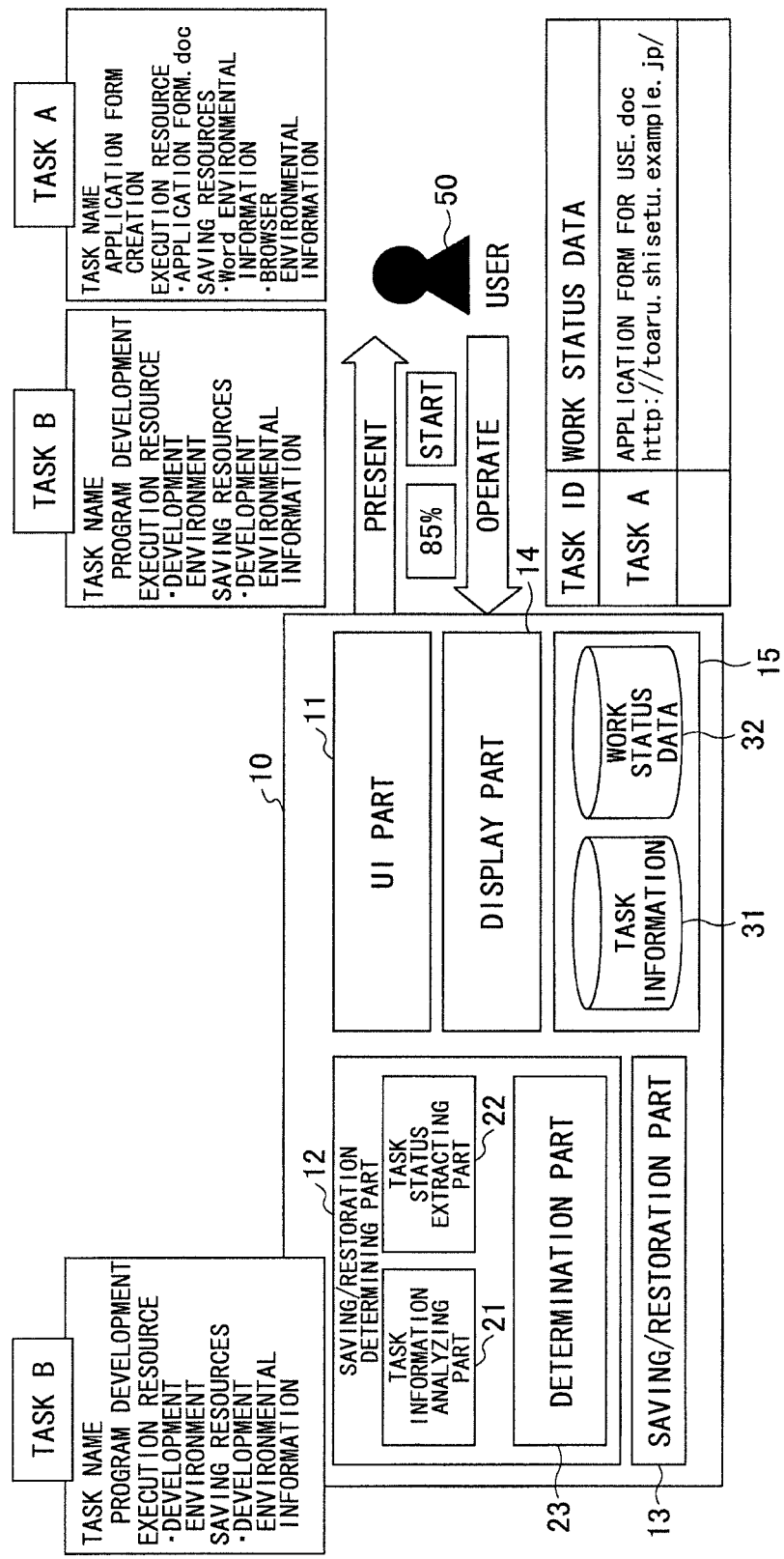
FIG. 14 is a diagram for illustrating a second embodiment of the task switching process.

FIG. 14 is a diagram for illustrating a second embodiment of the task switching process. According to the second embodiment illustrated in FIG. 14, for example, a task is saved or restored in accordance with the degree of progress of the task.

For example, the information processing apparatus 10 extracts the progress rate of a task, and the progress rate of 85% of Task A is detected from the user 50's operation. The extraction of a progress rate may be, but is not limited to, for example, a determination of the amount of data entry or how many of all the preset fields of an entry form are filled in with data.

Here, a new task is presented, and Task B is added. For example, the user 50 determines to "Start" Task B, and performs a start operation. At this point, the start operation of Task B is extracted before detection of an operation of the progress rate of 100% of Task A. Therefore, the task status extracting part 22 extracts the "Interruption" of Task A. As illustrated in FIG. 14, the saving/restoration part 13 saves the resources of Task A to the task information 31 and the work status data 32.

A specific description of an operation at the time of restoration in the second embodiment, which, for example, performs presentation by a pop-up screen after passage of a predetermined time the same as the above-described operation at the time of restoration in the first embodiment, is omitted herein.

Third Embodiment

Figure 15:
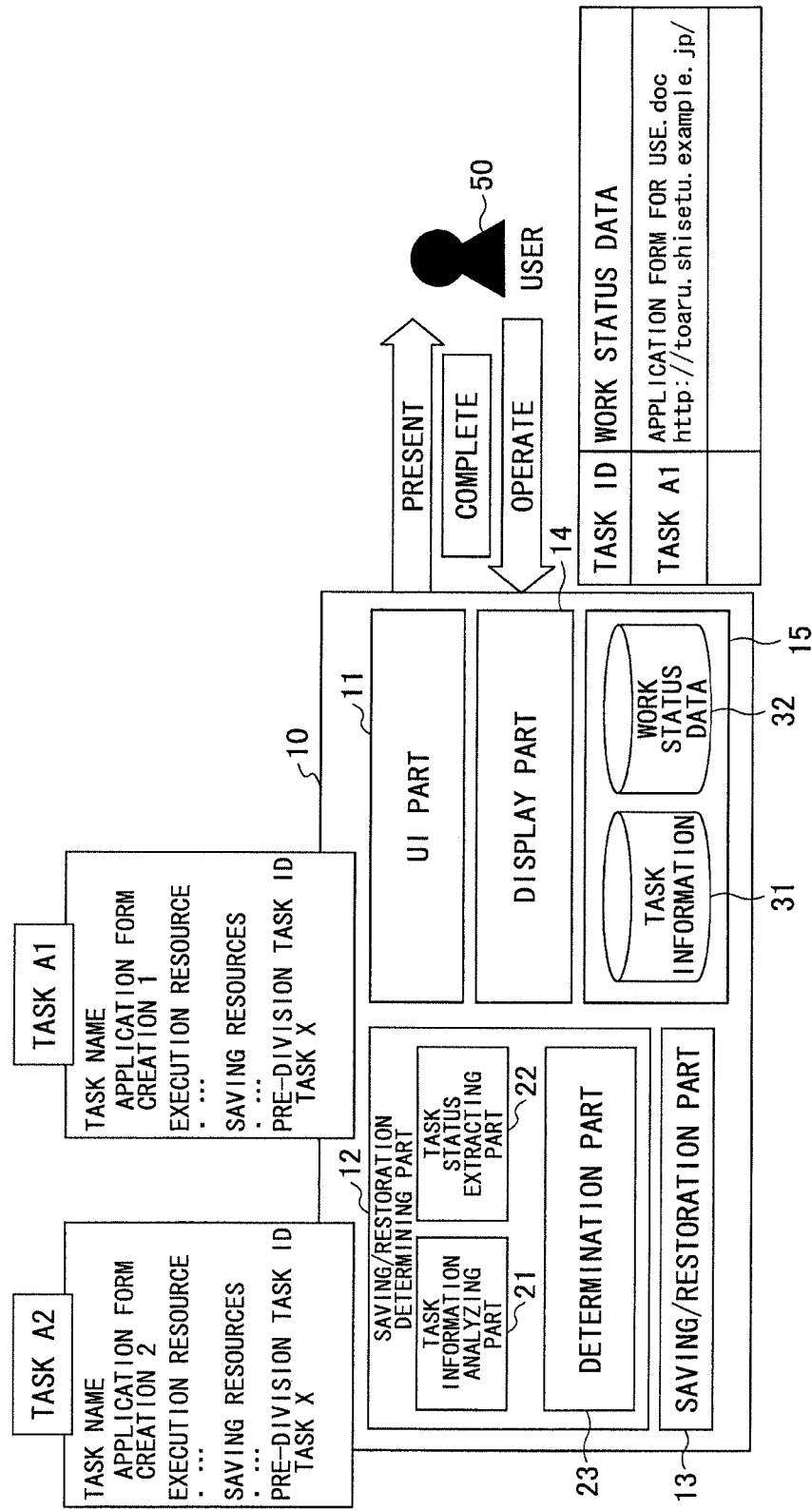
FIG. 15 is a diagram for illustrating a third embodiment of the task switching process.

FIG. 15 is a diagram for illustrating a third embodiment of the task switching process. The third embodiment illustrated in FIG. 15 illustrates, for example, an example of saving according to divisional tasks.

In saving according to divisional tasks, it is assumed that, for example, a four-hour task of a task ID of "Task X" is divided into and assigned to two two-hour tasks (for example, "Task A1" and "Task A2"). In this case, the user executes "Task A1" and an operation of "Completion" is extracted. The task status extracting part 22 normally classifies the work status as "Completed," but it is determined from the task information analyzing part 21 that there is a parent ID, namely, that this task has an interrupted procedure. Accordingly, the determination part 23 determines to save the above-described task. As illustrated in FIG. 15, the saving/restoration part 13 saves an opened Word document and a URL.

Furthermore, according to the third embodiment, when the processing of all divisional tasks is completed, "Completion" is finally determined to complete the process.

A specific description of an operation at the time of restoration in the third embodiment, which, for example, performs presentation by a pop-up screen after passage of a predetermined time the same as the above-described operation at the time of restoration in the first embodiment, is omitted herein.

<Example Screens>

Figure 16A:
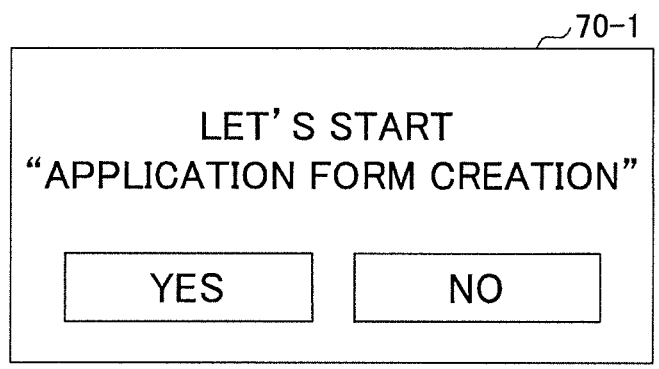
FIG. 16A is a diagram illustrating a (first) example screen in the task switching process.
Figure 16B:
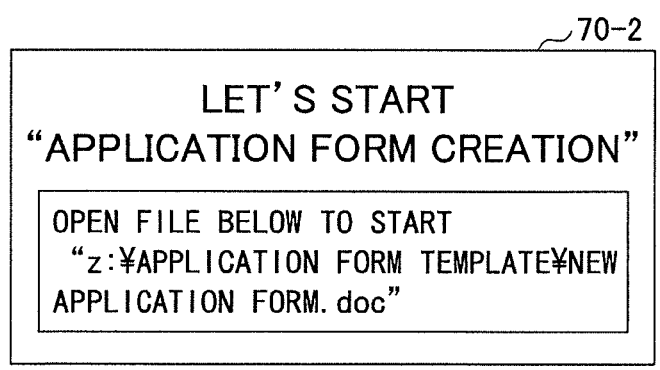
FIG. 16B is a diagram illustrating a (second) example screen in the task switching process.

Next, example screens in the task switching process are described using drawings. FIG. 16A through FIG. 16F are diagrams illustrating (first through sixth) example screens in the task switching process. FIG. 16A and FIG. 16B illustrate example screens presented before the start of a task. FIG. 16A illustrates the case of explicitly causing the user 50 to input an operation of "YES" or "NO" on a pop-up screen (a dialog screen) 70-1 displayed on the display part 14 with the message that "LET'S START 'APPLICATION FORM CREATION'." In the illustration of FIG. 16B, an execution resource such as a filename is explicitly written together on a pop-up screen 70-2. By thus displaying an execution resource, it is possible to facilitate recalling what kind of task it is.

Figure 16C:
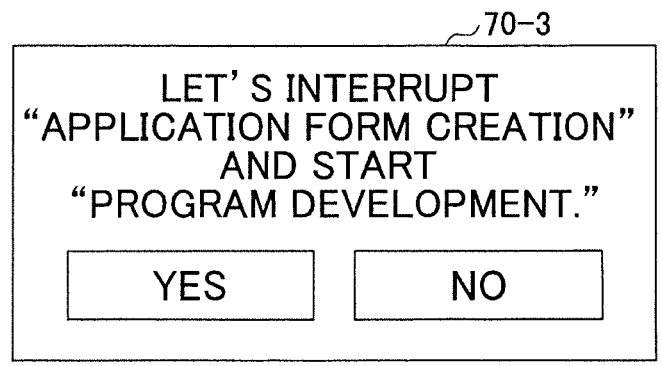
FIG. 16C is a diagram illustrating a (third) example screen in the task switching process.

FIG. 16C illustrates an example screen for causing another task (for example, "Program Development") to be executed during execution of a task (for example, "Application Form Creation"). FIG. 16C illustrates the case of explicitly causing the user 50 to input an operation of "YES" or "NO" as a pop-up screen 70-3 with a message for causing another task to be executed. As a non-limiting example, this screen may be presented when a pre-scheduled time to execute a task is passed or in response to passage of a predetermined time since the saving of a task.

Figure 16D:
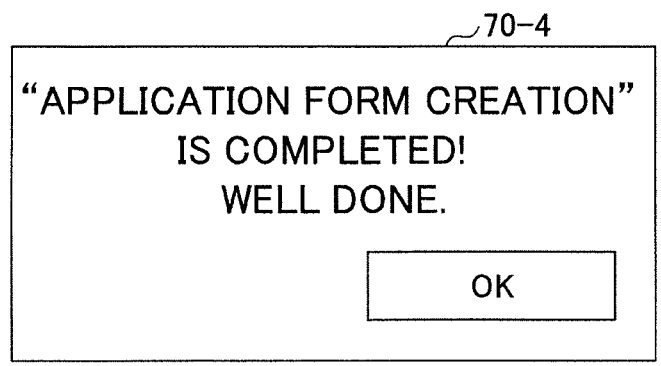
FIG. 16D is a diagram illustrating a (fourth) example screen in the task switching process.

In the illustration of FIG. 16D, a pop-up screen 70-4 at the time of detection of the completion of a task is illustrated. On the pop-up screen 70-4 illustrated in FIG. 16D, a message such as "'APPLICATION FORM CREATION' IS COMPLETED! WELL DONE" is displayed, but the contents of the message are not limited to this.

Figure 16E:
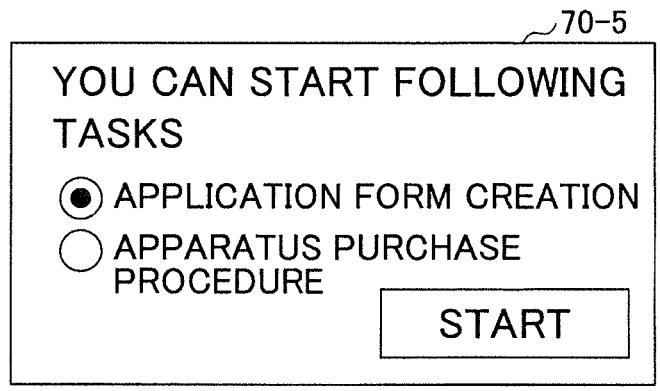
FIG. 16E is a diagram illustrating a (fifth) example screen in the task switching process.

As another example, in the illustration of FIG. 16E, a pop-up screen 70-5 on which a task to start is selected from among multiple tasks is illustrated. According to the pop-up screen 70-5 illustrated in FIG. 16E, a screen that explicitly causes the user 50 to select one of "Application Form Creation" and "Apparatus Purchase Procedure" is displayed with the message that "YOU CAN START FOLLOWING TASKS." The user 50 selects one and presses a START button to start or restore the selected task.

Figure 16F:
FIG. 16F is a diagram illustrating a (sixth) example screen in the task switching process.

In the illustration of FIG. 16F, a pop-up screen 70-6 on which a task that can be started is selected is illustrated. On the pop-up screen 70-6 of FIG. 16F, as many execution resources as the number of tasks are written together, and the user 50 can make a selection from them to restore and execute a corresponding task.

Through the above-described example screens, a task to save or restore is presented. Accordingly, a user can give an instruction to switch tasks on an as-needed basis. Therefore, it is possible to efficiently switch tasks. Example screens and the contents of a message are not limited to those described above.

As described above, according to this embodiment, it is possible to efficiently switch tasks. Furthermore, according to this embodiment, in interrupting and resuming a task, it is possible to efficiently save and restore a work environment (work status). For example, by saving and restoring a work environment using the work status of a task, it is possible to specify the timing of saving. Therefore, no unnecessary resources are used for saving. Furthermore, because it is possible to specify what to save task by task, no unnecessary resources are used for saving. Furthermore, it is possible to specify the contents of work to resume and its timing. Therefore, it is possible to perform restoration in line with a task to resume, and there is no need for a user to select what to restore, thus increasing convenience.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A task switching assisting method, comprising:
storing, by an information processing apparatus, task information, the task information being information regarding a task executed by the information processing apparatus in response to an instruction from a user, the task information including information related to execution of the task;
detecting, by the information processing apparatus, an operation on the task, the operation being input to the information processing apparatus by the user;
determining, by the information processing apparatus, a work status of the task, based on the detected operation on the task;
switching, by the information processing apparatus, from the task by saving the task by storing the task information of the task when the work status indicates an interruption of the task, and switching, by the information processing apparatus, to the task by restoring the task in correspondence to the task information of the task stored at a time of said saving the task when the work status indicates a start of the task;

determining, by the information processing apparatus, whether the task is one of a plurality of divisional tasks into which another task is divided;

determining, by the information processing apparatus, whether all of the plurality of divisional tasks are completed; and determining, by the information processing apparatus, the work status of the task indicating a completion of the task as indicating the interruption of the task, and saving, by the information processing apparatus, the task information of the task instead of deleting the task information of the task, in response to determining that the task is the one of the plurality of divisional tasks and that all of the plurality of divisional tasks are not completed.

2. The task switching assisting method as claimed in claim 1, comprising:

extracting, by the information processing apparatus, a work status of the user with respect to the task that is a target from an operation on a task execution resource by the user, and classifying, by the information processing apparatus, the extracted work status as one of a plurality of preset kinds.

3. The task switching assisting method as claimed in claim 1, comprising:

instructing, by the information processing apparatus, saving of the work status in response to the interruption of the task.

4. The task switching assisting method as claimed in claim 1, comprising:

when the work status corresponding to the task to be started is saved, instructing, by the information processing apparatus, restoration of the saved work status.

5. The task switching assisting method as claimed in claim 1, comprising:

presenting, by the information processing apparatus, a screen that presents whether to save or restore the work status to the user.

6. The task switching assisting method as claimed in claim 1, comprising:

updating, by the information processing apparatus, a saving resource from the task information; and when a same resource is used by a plurality of tasks, rendering, by the information processing apparatus, the resource saved in a different task a target of restoration.

7. The task switching assisting method as claimed in claim 1, wherein the task information includes internal information or external information of the information processing apparatus.

8. The task switching assisting method as claimed in claim 1, comprising:

changing, by the information processing apparatus, a manner of saving the task based on an expected interruption time of the task.

9. A non-transitory computer-readable recording medium having stored therein a program for causing a computer for an information processing apparatus to execute a task switching assisting process, the task switching assisting process comprising:

storing task information, the task information being information regarding a task executed by the information processing apparatus in response to an instruction from a user, the task information including information related to execution of the task;

detecting an operation on the task, the operation being input to the information processing apparatus by the user;

determining a work status of the task, based on the detected operation on the task;

switching from the task by saving the task by storing the task information of the task when the work status indicates an interruption of the task, and switching to the task by restoring the task in correspondence to the task information of the task stored at a time of said saving the task when the work status indicates a start of the task;

determining whether the task is one of a plurality of divisional tasks into which another task is divided;

determining whether all of the plurality of divisional tasks are completed; and determining the work status of the task indicating a completion of the task as indicating the interruption of the task, and saving the task information of the task instead of deleting the task information of the task, in response to determining that the task is the one of the plurality of divisional tasks and that all of the plurality of divisional tasks are not completed.

10. An information processing apparatus, comprising:

a storage part configured to store task information, the task information being information regarding a task executed by the information processing apparatus in response to an instruction from a user, the task information including information related to execution of the task;

a memory;

a processor coupled to the memory, and configured to detect an operation on the task, the operation being input to the information processing apparatus by the user;

determine a work status of the task, based on the detected operation on the task;

switch from the task by saving the task by storing the task information of the task when the work status indicates an interruption of the task, and switch to the task by restoring the task in correspondence to the task information of the task stored at a time of said saving the task when the work status indicates a start of the task;

determine whether the task is one of a plurality of divisional tasks into which another task is divided;

determine whether all of the plurality of divisional tasks are completed; and determine the work status of the task indicating a completion of the task as indicating the interruption of the task, and save the task information of the task instead of deleting the task information of the task, in response to determining that the task is the one of the plurality of divisional tasks and that all of the plurality of divisional tasks are not completed.

* * * * *